(12) United States Patent
Takahashi (10) Patent No.: US 12,536,913 B2
(45) Date of Patent: Jan. 27, 2026

(54) VEHICLE DISPATCH SUPPORT DEVICE, VEHICLE DISPATCH SERVICE SYSTEM, AND VEHICLE DISPATCH SUPPORT METHOD

(71) Applicants: Nissan Motor Co., Ltd., Kanagawa (JP); RENAULT S.A.S., Boulogne-Billancourt (FR)

(72) Inventor: Natsu Takahashi, Kanagawa (JP)

(73) Assignees: Nissan Motor Co., Ltd., Kanagawa (JP); RENAULT S.A.S., Boulogne-Billancourt (FR)

( * ) Notice: Subject to any disclaimer, the term of this patent is extended or adjusted under 35 U.S.C. 154(b) by 176 days.

(21) Appl. No.: 18/283,998

(22) PCT Filed: Mar. 25, 2021

(86) PCT No.: PCT/IB2021/000193
§ 371 (c)(1),
(2) Date: Sep. 25, 2023

(87) PCT Pub. No.: WO2022/200822
PCT Pub. Date: Sep. 29, 2022

(65) Prior Publication Data
US 2024/0169841 A1    May 23, 2024

(51) Int. Cl.
*G06Q 10/02*      (2012.01)
*G06Q 50/47*      (2024.01)
*G08G 1/00*      (2006.01)
*G08G 1/123*      (2006.01)

(52) U.S. Cl.
CPC ............. *G08G 1/202* (2013.01); *G06Q 10/02* (2013.01); *G06Q 50/47* (2024.01); *G08G 1/123* (2013.01)

(58) Field of Classification Search
CPC ........ G08G 1/202; G08G 1/123; G06Q 50/47; G06Q 10/02
See application file for complete search history.

(56) References Cited

U.S. PATENT DOCUMENTS

| | | |
|---|---|---|
| 9,836,974 B2 | 12/2017 | Kawamoto et al. |
| 2015/0228192 A1 | 8/2015 | Kawamoto et al. |
| 2018/0209804 A1 | 7/2018 | Rakah et al. |

(Continued)

FOREIGN PATENT DOCUMENTS

| | | |
|---|---|---|
| WO | 2014/045359 A1 | 3/2014 |
| WO | 2019/243885 A1 | 12/2019 |

*Primary Examiner* — Mathew Franklin Gordon
(74) *Attorney, Agent, or Firm* — Osha Bergman Watanabe & Burton LLP (57) ABSTRACT

A vehicle dispatch support device extracts one or more reserved vehicles for which a vehicle dispatch plan has been determined according to reserved vehicle dispatch request data requested by a reserved user; extracts one or more available vehicles that can arrive at a desired boarding place of the reserved user via a desired boarding place and a desired alighting place of the new user prior to a usage start time of the reserved user; calculates, as a margin time, a time difference between the usage start time and an arrival time for the available vehicles to arrive at the desired boarding place of the reserved user via the desired boarding place and the desired alighting place of the new user; and sets an available vehicle of which the margin time is short as a dispatch vehicle candidate to be dispatched to the new user.

13 Claims, 6 Drawing Sheets

(56) References Cited

U.S. PATENT DOCUMENTS

| | | |
|---|---|---|
| 2020/0041292 A1 | 2/2020 | Sugiyama et al. |
| 2020/0372418 A1 | 11/2020 | Hirose et al. |
| 2021/0042670 A1 | 2/2021 | Hirose et al. |
| 2021/0209517 A1 | 7/2021 | Shimodaira et al. |
| 2023/0204366 A1* | 6/2023 | Nagano ............ G08G 1/096775 701/533 |

* cited by examiner

VEHICLE DISPATCH SUPPORT DEVICE, VEHICLE DISPATCH SERVICE SYSTEM, AND VEHICLE DISPATCH SUPPORT METHOD

TECHNICAL FIELD

The present invention relates to a vehicle dispatch support device, a vehicle dispatch service system, and a vehicle dispatch support method.

BACKGROUND ART

Patent Literature 1 discloses an operation management device that determines an operation plan for an on-demand vehicle based on demands from multiple users and manages operation of the on-demand vehicle according to the determined operation plan. The operation management device searches for candidate routes along which the on-demand vehicle will travel, sets one of the searched candidate routes as a basic route, and sets a time required to pass through a point separated from the basic route as an adjustment time. In response to an additional reservation received from a user after the operation plan for the on-demand vehicle is determined, the operation management device, using the adjustment time, changes and determines the operation route such that the vehicle passes a desired boarding/alighting point requested by the user and can operate while meeting a desired time.

CITATION LIST

Patent Literature

[Patent Literature 1] WO 2014/045359

SUMMARY OF THE INVENTION

Problems to be Solved

According to the method disclosed in Patent Literature 1, if a vehicle with a long adjustment time receives an additional reservation with a short usage time, the vehicle is less likely to receive other additional reservations even if there is remaining adjustment time. This increases the time for the vehicle to operate without a user onboard, and there is waste of the energy used for the operation.

The present invention has been devised in consideration of the above problem, and an object of the present invention is to provide a vehicle dispatch support device, a vehicle dispatch service system, and a vehicle dispatch support method that can suppress waste of the energy used for a vehicle operation.

Solution to Problem

A vehicle dispatch support device according to one aspect of the present invention receives first vehicle dispatch request data requested by a first user, extracts one or more reserved vehicles for which a vehicle dispatch plan has been determined according to second request data that is requested by a second user, extracts one or more available vehicles that can arrive at a desired boarding place of the second user via a desired boarding place and a desired alighting place of the first user prior to a usage start time of the second user, and preferentially sets an available vehicle for which a margin time is relatively short as a dispatch vehicle candidate to be dispatched to the first user, the margin time being a time difference between the usage start time and an arrival time for the available vehicle to arrive at the desired boarding place of the second user via the desired boarding place and the desired alighting place of the first user.

Advantageous Effects

According to the present invention, waste of the energy used for a vehicle operation can be suppressed.

DESCRIPTION OF EMBODIMENTS

An embodiment of the present invention will be described below with reference to the accompanying drawings. In the illustrations of the drawings, the same parts are denoted with the same reference numerals, and therefore, the description thereof is omitted.

The configuration of a vehicle dispatch service system 10 according to the present embodiment will be described with reference to FIGS. 1 to 4. The vehicle dispatch service system 10 according to the present embodiment is a system for determining a vehicle dispatch plan for dispatching a vehicle in response to a vehicle dispatch request from a user.

Figure 1:
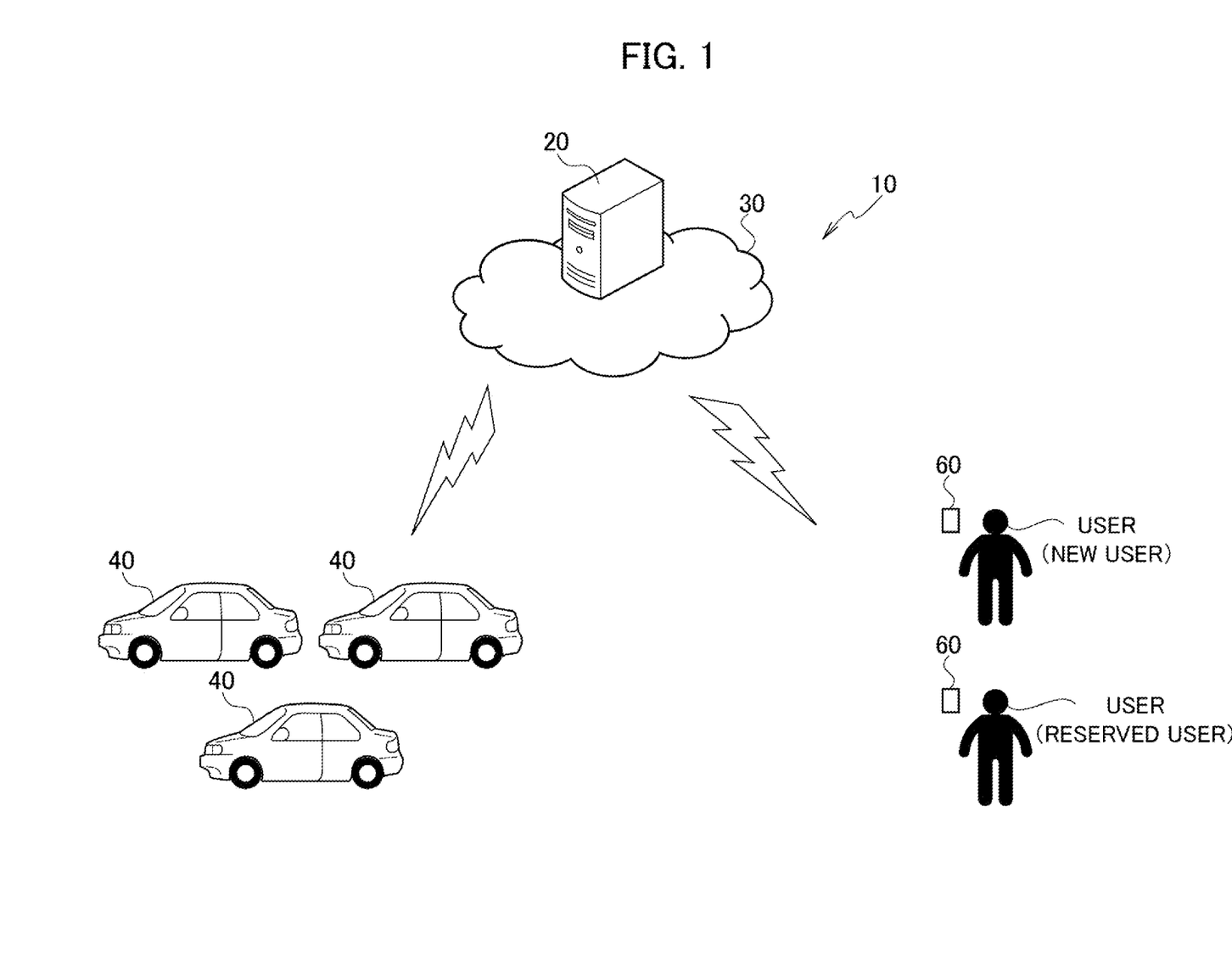
FIG. 1 is a diagram showing the configuration of a vehicle dispatch service system according to the present embodiment.

The vehicle dispatch service system 10 is mainly composed of a vehicle dispatch service server 20, a vehicle 40, and a user terminal 60. The vehicle dispatch service server 20, the vehicle 40, and the user terminal 60 are configured so as to be able to communicate with each other via a network 30. An example of the network 30 is the Internet. The network 30 may use mobile communication functions such as those of 4 G/LTE or 5G.

In the following description, the term "vehicle dispatch request data" means data used by the user to perform a vehicle dispatch request to the vehicle dispatch service server 20. The vehicle dispatch request data includes a desired boarding place, which is a point where the user desires to gets on a vehicle, and a desired alighting place, which is a point where the user desires to get off the vehicle. Note that the vehicle dispatch request data may include a desired transit point on the way to the desired alighting place from the desired boarding place, a desired boarding time which is a time at which the user desires to get on the vehicle, and a desired alighting time which is a time at which the user desires to get off the vehicle.

In addition, vehicle dispatch request data used for a vehicle dispatch plan described in the present embodiment is referred to as "new vehicle dispatch request data", and a user who has issued a vehicle dispatch request using the new vehicle dispatch request data is referred to as a "new user". In addition, vehicle dispatch request data which is received prior to the new vehicle dispatch request data and for which a vehicle dispatch plan has been determined is referred to as "reserved vehicle dispatch request data". A user who has issued a vehicle dispatch request using the reserved vehicle dispatch request data is referred to as a "reserved user". It is assumed that the reserved user is different from the new user, but the reserved user may be the new user himself or herself. When the terms the "user" and "vehicle dispatch request data" are simply used, the term "user" collectively means the new user and reserved user, and the term "vehicle dispatch request data" collectively means the new vehicle dispatch request data and reserved vehicle dispatch request data.

Figure 2:
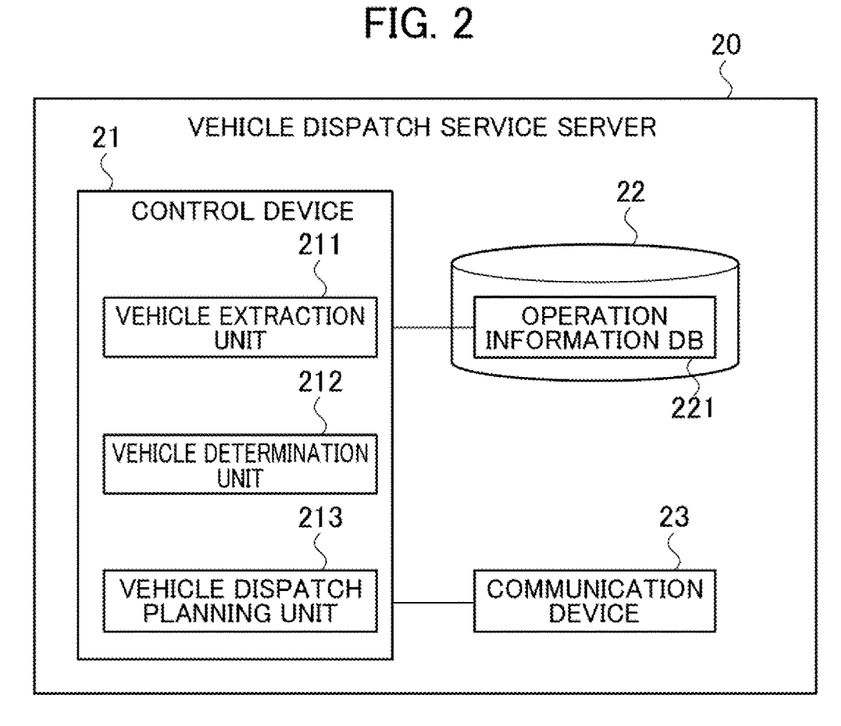
FIG. 2 is a block diagram showing the configuration of a vehicle dispatch service server shown in FIG. 1.

In FIG. 2, the vehicle dispatch service server 20 is operated, for example, by a business operator providing a transportation service using multiple vehicles 40, but the server is not limited thereto. The vehicle dispatch service server 20 is a vehicle dispatch support device that supports a vehicle dispatch plan for dispatching the vehicle 40, and includes a control device 21, a storage device 22, and a communication device 23.

The control device 21 determines a vehicle dispatch plan based on the vehicle dispatch request data received by the communication device 23. As the control device 21, a microcomputer (controller) composed mainly of a CPU, a memory, and an input/output interface can be used.

The CPU reads various computer programs stored in the memory or the like and executes various instructions included in the programs. By executing the programs, the CPU functions as multiple information processing circuits of the control device 21.

The control device 21 includes a vehicle extraction unit 211, a vehicle determination unit 212, and a vehicle dispatch planning unit 213 as one or more information processing circuits. The vehicle extraction unit 211 receives the vehicle dispatch request data received by the communication device 23 and extracts one or more vehicles 40 suitable for the vehicle dispatch request of the user based on the vehicle dispatch request data. The vehicle dispatch planning unit 213 determines the vehicle 40 to be dispatched to the user from the one or more vehicles 40 extracted based on the vehicle dispatch request data. The vehicle dispatch planning unit 213 determines the vehicle dispatch plan for the vehicle 40 to be dispatched. The vehicle dispatch plan includes the user's desired boarding place, desired transit point, and desired alighting place, and a travel route from the desired boarding place to the desired alighting place. The vehicle 40 for which the vehicle dispatch plan has been determined according to the vehicle dispatch request data is referred to as a "reserved vehicle". For the reserved vehicle 40, a route is set which is for the vehicle to drive around until a usage start time described later, that is, while the user is not using the vehicle. While the user is not using the vehicle, the reserved vehicle 40 will travel on the route for driving around.

One of the features of the present embodiment lies in that the control device 21 dispatches the reserved vehicle 40 in response to a vehicle dispatch request from a new user before dispatching the reserved vehicle 40 to the reserved user. At this time, the control device 21 preferentially sets the reserved vehicle 40, which can suppress waste of the energy used in the operation, as a candidate for a vehicle to be dispatched to the new user, in consideration of the content of vehicle dispatch requests from the reserved user and the new user.

Specifically, the vehicle extraction unit 211 extracts one or more reserved vehicles 40 from among the multiple vehicles 40 scheduled to be used by the vehicle dispatch service server 20 to provide the transportation service, and extracts one or more available vehicles 40 from the extracted reserved vehicles 40. An available vehicle 40 refers to a reserved vehicle 40 that can arrive at the desired boarding place of the reserved user via the desired boarding place and desired alighting place of the new user prior to the usage start time when the reserved user is to start using the reserved vehicle 40.

The vehicle determination unit 212 calculates, as a margin time, a time difference between the usage start time of the reserved user and an arrival time when the vehicle is to arrive at the desired boarding place of the reserved user from the current position via the desired boarding place and desired alighting place of the new user, for each extracted available vehicle 40. Then, the vehicle dispatch planning unit 213 preferentially sets an available vehicle 40 with a relatively short margin time from among one or more available vehicles 40 as a candidate for a vehicle to be dispatched to the new user.

The storage device 22 is a storage unit that stores various databases necessary for the transportation service. The storage device 22 has an operation information DB (operation information database) 221.

The operation information DB 221 is a database for managing operation information of the vehicle 40. The operation information is managed for each vehicle 40 scheduled to be used by the vehicle dispatch service server 20 to provide a transportation service. A vehicle ID for identifying the vehicle 40 is associated with each piece of operation information. The content of the operation information DB 221 is managed by the vehicle dispatch planning unit 213 and updated as necessary. The vehicle dispatch planning unit 213 can receive data necessary for managing the operation information by communicating with the vehicle 40.

The operation information includes information on the vehicle dispatch service, specifically, information on whether the vehicle 40 is a vehicle in operation according to a vehicle dispatch plan, information on whether the vehicle 40 is an empty vehicle, information on whether the vehicle 40 is a reserved vehicle, and, if a vehicle dispatch plan has been determined, information on the vehicle dispatch plan. Further, the operation information can include information on the vehicle 40, specifically, information on the current position of the vehicle 40, information on the current amount of energy remaining (the amount of fuel remaining, the amount of charge remaining) of the vehicle 40, and the like.

In addition, the storage device 22 holds map data including information on a map in order to generate a travel route necessary for the vehicle dispatch plan and to recognize a positional relationship between the user and the vehicle 40.

The vehicle dispatch service server 20 may be configured to have the storage device 22, or may acquire the operation information from an external data server by means of cloud computing.

The communication device 23 communicates with the vehicle 40 or the user terminal 60 via the network 30. The communication device 23 receives prescribed data from the vehicle 40 and the user terminal 60 and transmits prescribed data to the vehicle 40 and the user terminal 60. Further the communication device 23 can acquire road traffic data including road traffic information by communicating with an external device (not shown) via the network 30. For example, the communication device 23 may be a device with a mobile communication function such as those of 4G/LTE or 5G, or a device with a Wifi communication function.

Figure 3:
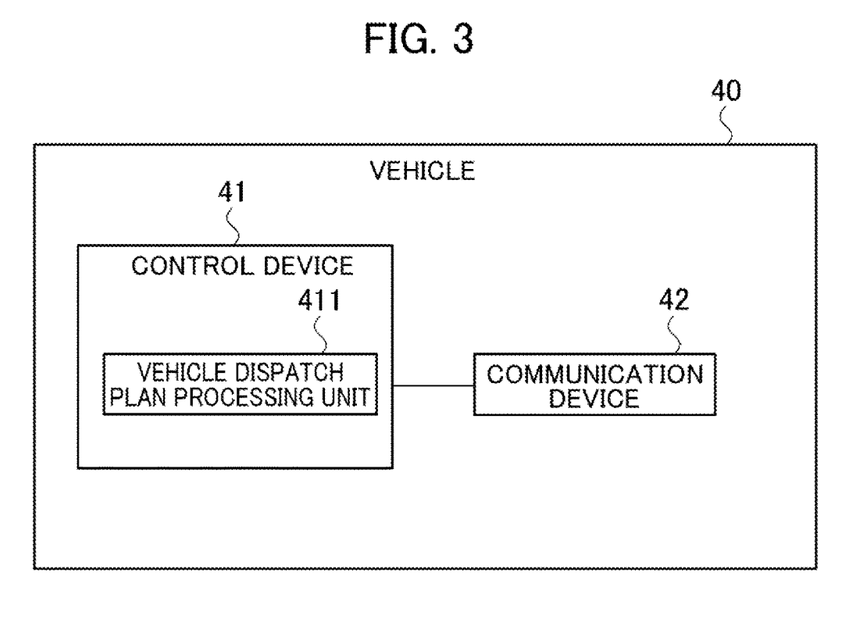
FIG. 3 is a block diagram showing the configuration of vehicles shown in FIG. 1.

In FIG. 3, the vehicle 40 is a vehicle (service vehicle) in which the user gets on and which provides a transportation service, and there are multiple vehicles 40. In the example shown in FIG. 1, three vehicles 40 are shown, but the number of vehicles is not limited thereto. The vehicle 40 may be a vehicle which travels by means of an automatic driving function without a driver in the vehicle, or may be a vehicle that travels by means of manual driving performed by the driver. The vehicle 40 may also be a vehicle that travels by means of an automatic driving function with the driver in the vehicle.

Automatic driving indicates a state in which, for example, at least one actuator out of actuators such as a brake, an accelerator, and a steering wheel is controlled without being operated by an occupant. Therefore, no problems are caused even if other actuators are operated by an occupant. Further, automatic driving may be a state in which any vehicle control such as acceleration/deceleration control and lateral position control is performed. Further, manual driving indicates, for example, a state in which a brake, an accelerator, and a steering wheel are operated by an occupant.

The vehicle 40 may be any one of a vehicle driven only by an engine, a hybrid vehicle driven by an engine and an electric motor, and an electric vehicle driven only by an electric motor. In the case of an engine-driven vehicle, the remaining amount of energy corresponds to the remaining amount of fuel, and in the case of an electric vehicle, the remaining amount of energy corresponds to the remaining amount of charge. In the case of a hybrid vehicle, the remaining amount of energy corresponds to the remaining amount of fuel and the remaining amount of charge.

In FIG. 3, the vehicle 40 includes a control device 41 and a communication device 42.

The control device 41 controls the vehicle 40 based on vehicle dispatch plan data received by the communication device 42. As the control device 41, a microcomputer (controller) composed mainly of a CPU, a memory, and an input/output interface can be used.

The CPU reads various computer programs stored in the memory or the like and executes various instructions included in the programs. By executing the programs, the CPU functions as multiple information processing circuits of the control device 41.

The control device 41 includes a vehicle dispatch plan processing unit 411 as one or more information processing circuits.

The vehicle dispatch plan processing unit 411 receives the vehicle dispatch plan data received by the communication device 42 and performs various processing based on the vehicle dispatch plan data. In the case of a vehicle 40 that travels by means of an automatic driving function, the vehicle dispatch plan processing unit 411 controls various actuators (steering wheel actuators, accelerator pedal actuators, brake actuators, and the like) of the vehicle 40 and performs automatic driving based on the vehicle dispatch plan data. The automatic driving performed by the vehicle dispatch plan processing unit 411 enables the vehicle 40 to travel automatically according to the vehicle dispatch plan. In the case of a vehicle 40 that travels by means of manual driving, the vehicle dispatch plan processing unit 411 controls a display device, speaker, or the like to present the vehicle dispatch plan to the driver.

Further, the vehicle dispatch plan processing unit 411 transmits information on the vehicle 40 to the vehicle dispatch service server 20 in response to a request from the vehicle dispatch service server 20 or at a prescribed cycle by using the communication device 23.

The communication device 42 communicates with the vehicle dispatch service server 20 via the network 30. The communication device 42 receives prescribed data from the vehicle dispatch service server 20 and transmits prescribed data to the vehicle dispatch service server 20. For example, the communication device 42 may be a device with a mobile communication function such as those of 4G/LTE or 5G, or a device with a Wifi communication function.

Figure 4:
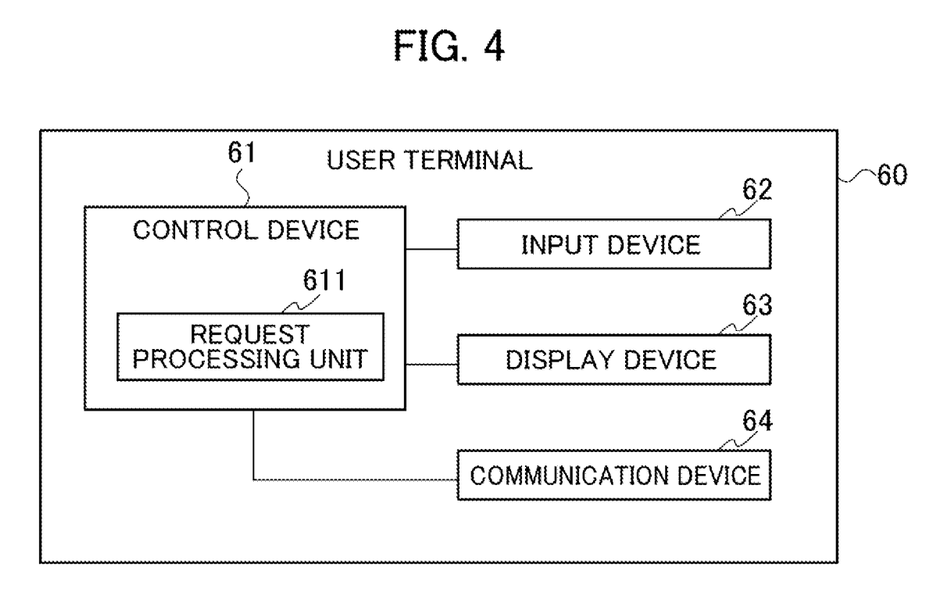
FIG. 4 is a block diagram showing the configuration of user terminals shown in FIG. 1.

In FIG. 4, the user terminal 60 is a device that receives a user's vehicle dispatch request and is an operating terminal with communication functions that is a device that the user uses on a daily basis, such as a mobile phone, a smartphone, a personal digital assistant (PDA), or the like. FIG. 1 shows two user terminals 60, but the number of the user terminals 60 is not limited thereto.

The user terminal 60 includes a control device 61, an input device 62, a display device 63, and a communication device 64.

The control device 61 receives the user's vehicle dispatch request and generates vehicle dispatch request data. As the control device 61, a microcomputer (controller) composed mainly of a CPU, a memory, and an input/output interface can be used.

In the memory, a computer program is installed to make a terminal function as the user terminal 60 in the vehicle dispatch service system 10. By executing the computer program, the control device 61 functions as one or more information processing circuits of the user terminal 60.

The control device 61 includes a request processing unit 611 as one or more information processing circuits.

The request processing unit 611 generates vehicle dispatch request data corresponding to the user's vehicle dispatch request. When the user requests to dispatch a vehicle, the user operates the input device 62 to input the content of the vehicle dispatch request. An operation signal according to the user's input operation is input to the request processing unit 611 from the input device 62. The request processing unit 611 generates vehicle dispatch request data based on the operation signal.

The input device 62 is a device for the user to perform the input operation. The display device 63 is controlled by the request processing unit 611 and displays necessary information. For example, for the input device 62, a touch panel can be used through which the user can perform an input operation according to information displayed on the display device 63.

The communication device 64 communicates with the vehicle dispatch service server 20 via the network 30. The communication device 64 receives prescribed data from the vehicle dispatch service server 20 and transmits prescribed data to the vehicle dispatch service server 20. For example, the communication device 64 may be a device with a mobile communication function such as those of 4G/LTE or 5G, or a device with a Wifi communication function.

A series of flows in the vehicle dispatch service system 10 according to the present embodiment will be described below with reference to FIGS. 5 and 6.

Figure 5:
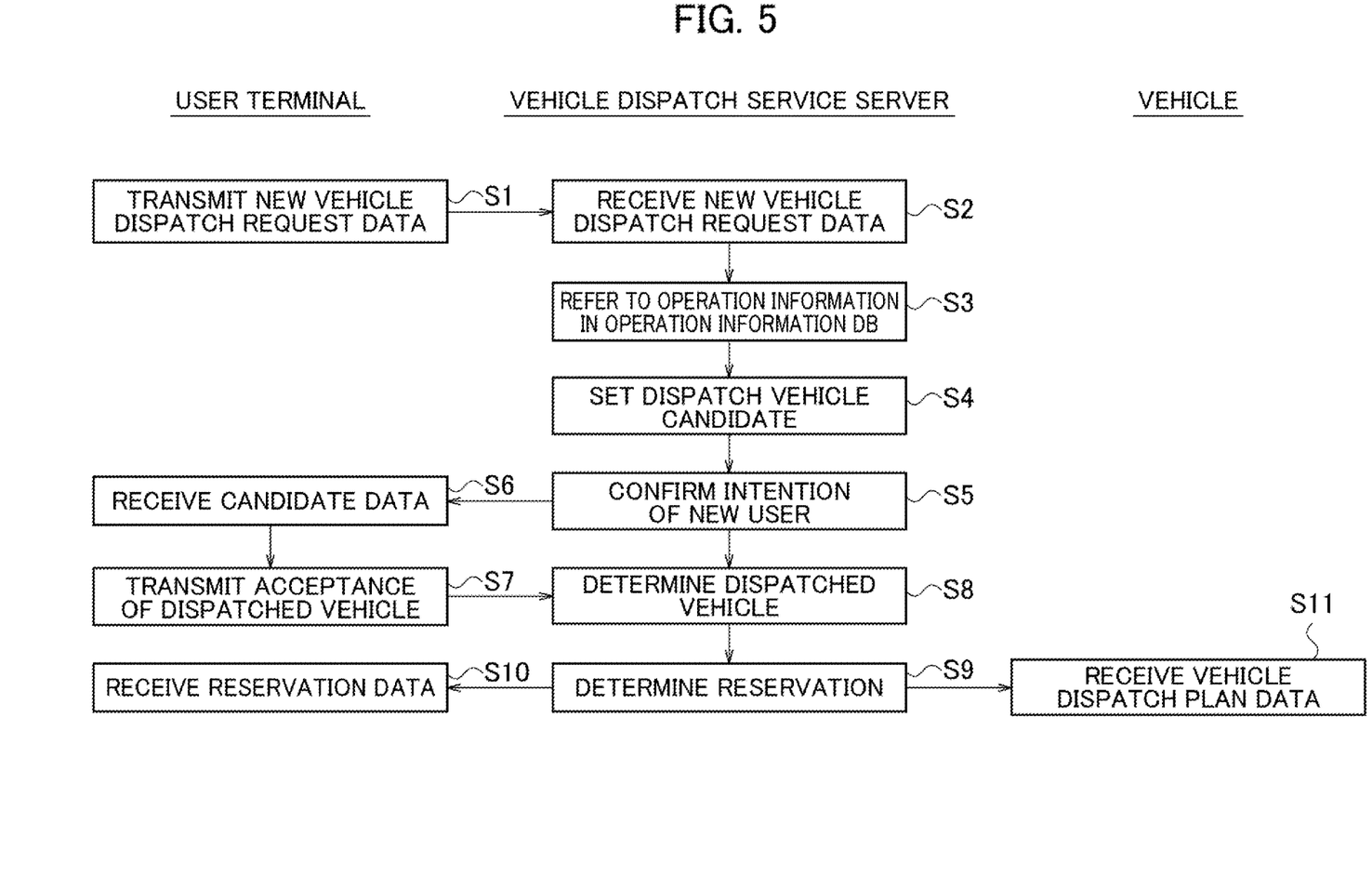
FIG. 5 is a sequence chart showing the flow of processing performed in the vehicle dispatch service system.
Figure 6:
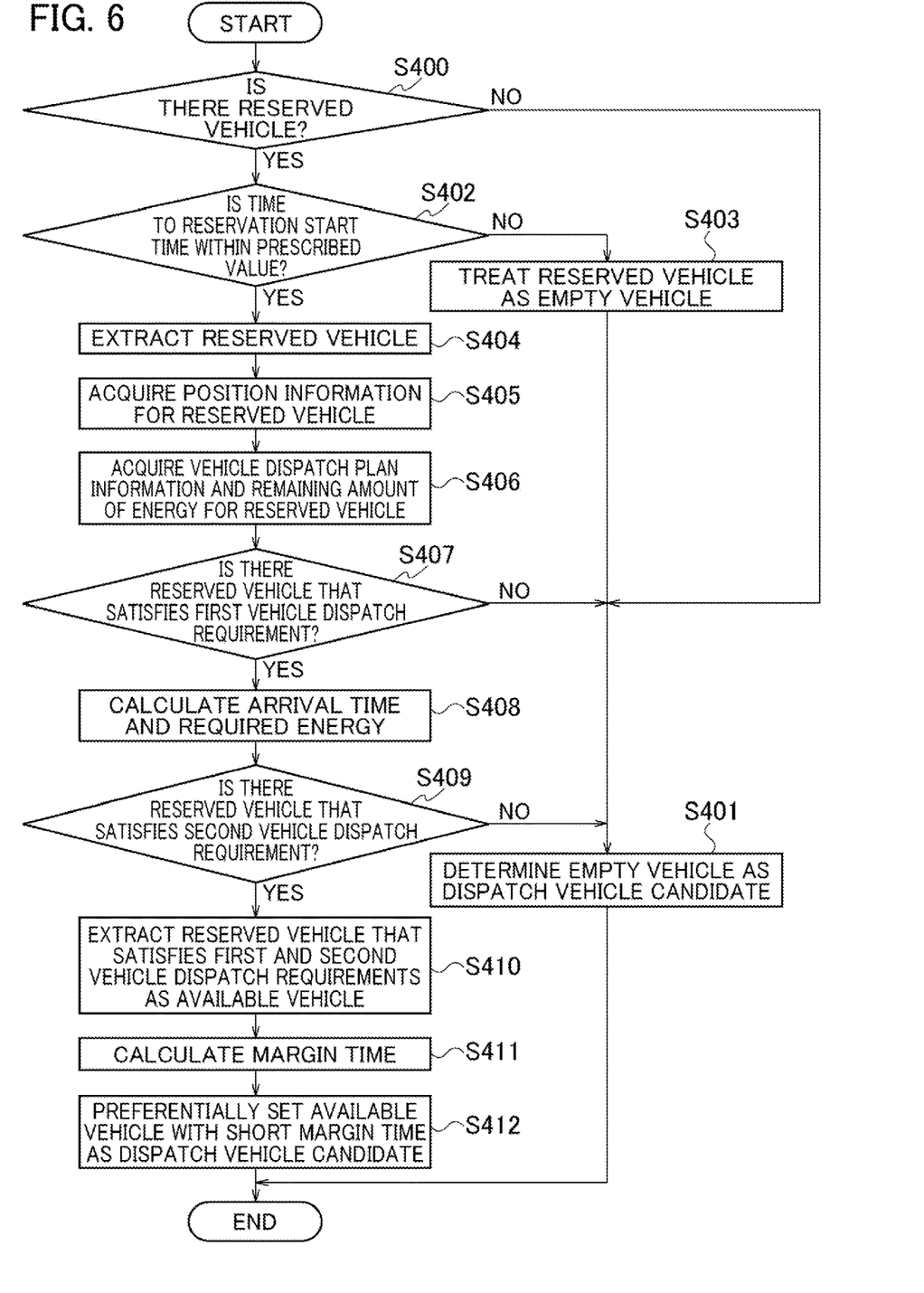
FIG. 6 is a flowchart showing the flow of processing performed by the vehicle dispatch service server.

First, as shown in FIG. 5, after the user terminal 60 generates new vehicle dispatch request data in response to a vehicle dispatch request from a new user, the user terminal 60 transmits the new vehicle dispatch request data to the vehicle dispatch service server 20 (step S1). After the user terminal 60 transmits the new vehicle dispatch request data, the vehicle dispatch service server 20 receives the new vehicle dispatch request data (step S2).

The vehicle dispatch service server 20 refers to operation information in the operation information DB 221 (step S3) and sets a dispatch vehicle candidate (step S4).

The processing in which the vehicle dispatch service server 20 sets the dispatch vehicle candidate (a vehicle dispatch support method) will be described in detail with reference to FIG. 6. The processing is performed by the control device 21 of the vehicle dispatch service server 20.

In step S400, the control device 21 determines, based on the operation information in the operation information DB 221, whether there is a reserved vehicle 40 for which a vehicle dispatch plan to a reserved user has been determined, among the multiple vehicles 40 managed by the vehicle dispatch service server 20.

If there is no reserved vehicle 40 (NO in step S400), the control device 21 determines an empty vehicle 40 as being the dispatch vehicle candidate (step S401). If there are multiple empty vehicles 40, the control device 21 determines one or more empty vehicles 40 optionally selected from the multiple empty vehicles 40 as being the dispatch vehicle candidate.

If there are reserved vehicles 40 (YES in step S400), the control device 21 determines whether there is a reserved vehicle 40 having a standby time of a prescribed value or less, the standby time being the time from a new request received time to the usage start time of the reserved user (step S402). Here, the new request received time is a time when the new vehicle dispatch request data is received. The usage start time corresponds to a time when the reserved user is to start using the reserved vehicle 40, that is, the desired boarding time of the reserved user. The prescribed value used in the determination made in step S403 is a value for determining whether the standby time is sufficiently long. For example, the prescribed value is determined as being a value such as a value of 10% of the daily operating hours of the reserved vehicle 40.

If there is no reserved vehicle 40 of which the standby time is the prescribed value or less (NO in step S402), the control device 21 treats the reserved vehicle 40 as an empty vehicle 40 (step S403). Then, the control device 21 determines the empty vehicle 40 as being the dispatch vehicle candidate (step S401).

If there is a reserved vehicle 40 of which the standby time is the prescribed value or less (YES in step S402), the control device 21 extracts the reserved vehicle 40 of which the standby time is the prescribed value or less. By performing the processing, one or more reserved vehicles 40 are extracted. Then, the control device 21 performs processing of step S405 and thereafter for the one or more extracted reserved vehicles 40.

In step S405, the control device 21 acquires position information for each reserved vehicle 40. The control device 21 can acquire the position information from the operation information managed in the operation information DB 221. However, the control device 21 may acquire the position information by receiving data of the position information from the reserved vehicles 40 using the communication device 23.

In step S406, the control device 21 acquires the vehicle dispatch plan and the remaining amount of energy for each reserved vehicle 40. The control device 21 can acquire the vehicle dispatch plan and the remaining amount of energy from the operation information managed in the operation information DB 221. However, the control device 21 may acquire the remaining amount of energy by receiving the remaining amount of energy from the reserved vehicle 40 using the communication device 23.

In step S407, the control device 21 determines whether there is a reserved vehicle 40 that satisfies a first vehicle dispatch requirement. The first vehicle dispatch requirement is that a vehicle is a reserved vehicle 40 that is present within a first range that is set based on the new user's desired boarding place, and that a vehicle is a reserved vehicle 40 for which the desired boarding place of the reserved user is present within a second range that is set based on the new user's desired alighting place.

In the first vehicle dispatch requirement, the first range refers to a range of a certain distance centered on, for example, the new user's desired boarding place. However, the first range may be a range in which the vehicle can arrive at the new user's desired boarding place within a certain time. The same applies to the second range.

If there is no reserved vehicle 40 that satisfies the first vehicle dispatch requirement (NO in step S407), the control device 21 determines an empty vehicle 40 as being the dispatch vehicle candidate (step S401). Meanwhile, if there is a reserved vehicle 40 that satisfies the first vehicle dispatch requirement (YES in step S407), the processing proceeds to step S408.

In step S408, the control device 21 calculates both the arrival time and required energy for each reserved vehicle 40. The arrival time is the time required for the vehicle to arrive at the desired boarding place of the reserved user from the current position of the reserved vehicle 40 via the desired boarding place and desired alighting place of the new user. Further, the required energy is the sum of the energy required for the vehicle to arrive at the desired boarding place of the reserved user from the current position of the reserved vehicle 40 via the desired boarding place and desired alighting place of the new user and the energy required for the vehicle to arrive at the desired alighting place of the reserved user from the desired boarding place of the reserved user. In calculating the time and energy above, the control device 21 can take into account the travel route along which the reserved vehicle 40 is to travel and the road traffic situation on the travel route.

In step S409, the control device 21 determines whether there is a reserved vehicle 40 that satisfies a second vehicle dispatch requirement. The second vehicle dispatch requirement is that a vehicle is a reserved vehicle 40 of which the arrival time determined in step S408 is earlier than the usage start time of the reserved user, and is a reserved vehicle 40 of which the remaining amount of energy is greater than the required energy.

If there is no reserved vehicle 40 that satisfies the second vehicle dispatch requirement (NO in step S409), the control device 21 determines the empty vehicle 40 as being the dispatch vehicle candidate (step S401). Meanwhile, if there is a reserved vehicle 40 that satisfies the second vehicle dispatch requirement (YES in step S409), the processing proceeds to step S410.

In step S410, the control device 21 extracts a reserved vehicle 40 that satisfies the first vehicle dispatch requirement and the second vehicle dispatch requirement from one or more reserved vehicles 40 as being an available vehicle 40. By performing the processing, one or more available vehicles 40 are extracted. Then, the control device 21 performs processing of step S411 and thereafter for one or more extracted available vehicles 40.

In step S411, the control device 21 calculates a margin time for each available vehicle 40. The margin time is the time difference between the usage start time of the reserved user and the arrival time (the arrival time acquired in step S408) for the vehicle to arrive at the desired boarding place of the reserved user from the current position of the reserved vehicle 40 via the desired boarding place and desired alighting place of the new user.

In step S412, the control device 21 preferentially sets an available vehicle 40 with a relatively short margin time from among the extracted available vehicles 40 as a candidate for a vehicle to be dispatched to the new user. At least one available vehicle 40 may be set as the dispatch vehicle candidate. However, two or more available vehicles 40 may be set, and the control device 21 sets a preset number of available vehicles 40 as dispatch vehicle candidates. In the present embodiment, it is assumed that two available vehicles 40 are set as dispatch vehicle candidates, for example.

Figure 7:
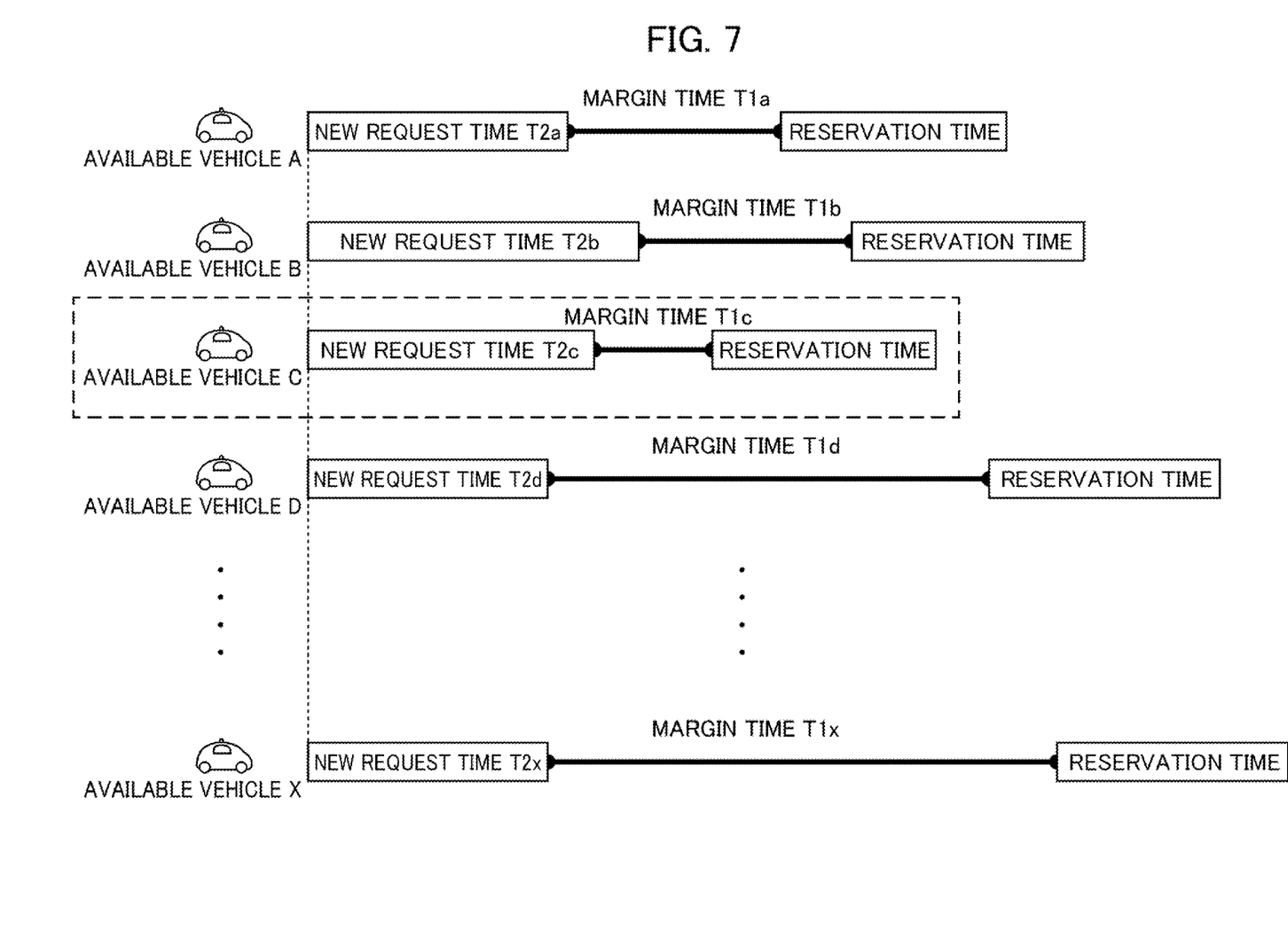
FIG. 7 is an explanatory diagram showing the concept of processing for setting a dispatch vehicle candidate from available vehicles.

The concept of the processing for setting the dispatch vehicle candidate will be described below. FIG. 7 shows margin times T1a to T1x and new request times T2a to T2x for each available vehicle A to X. The new request times T2a to T2x are times from the new request received time to the arrival time for the vehicle to arrive at the desired boarding place of the reserved user via the new user's desired boarding place and desired alighting place. The reservation time is the time for the reserved vehicle 40 to arrive at the reserved user's desired alighting place from the reserved user's desired boarding place.

In the example shown in FIG. 7, among the available vehicles A to X, the available vehicle C has the shortest margin time T1c, and the margin times T1a and T1b of the available vehicles A and B are the next shortest. The margin times T1d to T1x of the available vehicles D to X are longer than the margin times T1a and T1b of the available vehicles A and B.

In such a case, the control device 21 sets the available vehicle C, which has the shortest margin time T1c, as a first dispatch vehicle candidate. Suppose that, when the margin time T1a is compared with the margin time T1b, the margin time T1b is slightly shorter than the margin time T1a. In the above case, the control device 21 sets the available vehicle B as a second dispatch vehicle candidate. Accordingly, the control device 21 preferentially sets the available vehicles B and C with relatively short margin times from among the extracted available vehicles A to X as dispatch vehicle candidates.

In addition, even if there are multiple available vehicles 40 that are determined as having relatively short margin times, the margin times may be the same or the time difference may be within a prescribed determination time. In this case, the control device 21 preferentially sets an available vehicle 40 with a relatively short new request time as a dispatch vehicle candidate.

Suppose that the margin times T1a and T1b shown in FIG. 7 are approximately the same, for example. In this case, the control device 21 compares the new request time T2a of the available vehicle A with the new request time T2b of the available vehicle B. If it is assumed that the new request time T2a is shorter than the new request time T2b, the control device 21 sets the available vehicle A with the relatively short new request time as a dispatch vehicle candidate. In this way, the control device 21 preferentially sets the available vehicles A and C with the relatively short margin times and the relatively short new request times from among the extracted available vehicles A to X as dispatch vehicle candidates.

After a dispatch vehicle candidate is determined in this way, the control device 21 generates candidate data including information on the dispatch vehicle candidate. If the dispatch vehicle candidate is set based on the margin time, the available vehicle 40 may be set as a dispatch vehicle candidate based on not only simply whether the margin time is long or short but also the condition that the margin time is shorter than a threshold time.

As shown in FIG. 5, after the vehicle dispatch service server 20 transmits the candidate data to the user terminal 60 to confirm the intention of the new user (step S5), the user terminal 60 receives the candidate data (step S6). The user terminal 60 displays the information of the dispatch vehicle candidate on the display device 63 according to the candidate data. If the user accepts the dispatched vehicle 40 through an operation input to the input device 62, the user terminal 60 transmits the acceptance of the dispatched vehicle 40 to the vehicle dispatch service server 20 (step S7). The acceptance of the dispatched vehicle 40 is performed by means of a method such as selecting any one dispatched vehicle 40 from among the dispatch vehicle candidates.

After receiving the acceptance of the dispatched vehicle 40, the vehicle dispatch service server 20 determines the dispatched vehicle 40 based on the accepted information (step S8). The vehicle dispatch service server 20 determines the vehicle dispatch plan according to the new vehicle dispatch request data and the reserved vehicle dispatch request data and determines a reservation (step S9).

The vehicle dispatch service server 20 transmits reservation data including information such as the dispatched vehicle 40, desired boarding place, and desired alighting place to the user terminal 60 of the new user (step S10). Further, the vehicle dispatch service server 20 transmits vehicle dispatch plan data showing information of the determined vehicle dispatch plan to the dispatched vehicle 40 accepted by the new user (step S11).

In this way, in the present embodiment, the vehicle dispatch service server 20 preferentially sets an available vehicle 40 with a relatively short margin time as a dispatch vehicle candidate. According to the dispatch vehicle candidate, even if the vehicle arrives at the desired boarding place of the reserved user via the desired boarding place and desired alighting place of the new user, the time from the arrival time to the reserved user's usage start time is shortened. Accordingly, even if the dispatch vehicle candidate is dispatched to the new user prior to dispatching the vehicle to the reserved user, the time that the vehicle 40 operates without a user onboard can be reduced. This can suppress waste of the energy used for the operation of the vehicle 40.

In the present embodiment, the vehicle dispatch service server 20 extracts one or more reserved vehicles 40 of which the standby time is a preset determination time or shorter. The vehicle dispatch service server 20 does not extract a reserved vehicle 40 of which the standby time is long, because it is desirable for a reserved vehicle 40 with a sufficiently long time until the usage start time of the reserved user to be treated as an empty vehicle 40. Accordingly, only a reserved vehicle 40 of which there is a possibility that energy may be wasted in operating the vehicle due to dispatch of the vehicle to a new user can be set as a processing target. This can suppress waste of the energy used for the operation of the vehicle 40.

In the present embodiment, the vehicle dispatch service server 20 preferentially sets an available vehicle 40 with a relatively short margin time and a relatively short new request time as a dispatch vehicle candidate. The new request time differs for each available vehicle 40. However, for any of the available vehicles 40, the time required for the vehicle to arrive at the new user's desired alighting place from the new user's desired boarding place is the same. Therefore, the shorter the sum of the time required for the vehicle to arrive at the new user's desired boarding place from the current position of the available vehicle 40 and the time required for the vehicle to arrive at the reserved user's desired boarding place from the new user's desired alighting place, the shorter the new request time. Therefore, by setting an available vehicle 40 with a relatively short new request time as a dispatch vehicle candidate, the time required for the vehicle 40 to operate without a user onboard can be reduced. This can suppress waste of the energy used for the operation of the vehicle 40.

In the present embodiment, the vehicle dispatch service server 20 extracts a reserved vehicle 40 with a remaining amount of energy greater than the required energy as the available vehicle 40. That is, if this available vehicle 40 is used, the energy required for operation in accordance with the reserved vehicle dispatch request data will remain when the vehicle arrives at the reserved user's desired boarding place via the new user's desired boarding place and desired alighting place. This can prevent a situation where due to dispatching the vehicle 40 to the new user, the energy of the vehicle 40 runs out while the vehicle is operating in accordance with the reserved vehicle dispatch request data. This makes it possible to achieve compatibility between the new vehicle dispatch request data and the reserved vehicle dispatch request data.

According to the vehicle dispatch service server 20 of the present embodiment, the vehicle dispatch service server 20 extracts a reserved vehicle 40 that is present in the first range as an available vehicle 40, and therefore the available vehicle 40 is a reserved vehicle 40 that is present close to the new user's desired boarding place. In this way, a reserved vehicle 40 that can be efficiently dispatched can be extracted as an available vehicle 40.

Further, according to the vehicle dispatch service server 20 of the present embodiment, the vehicle dispatch service server 20 extracts a reserved vehicle 40 for which the desired boarding place of the reserved user is present within the second range as an available vehicle 40. Therefore, the available vehicle 40 is close to the desired boarding place of the reserved user relative to the desired alighting place of the new user. Accordingly, a reserved vehicle 40 that can be efficiently dispatched can be extracted as the available vehicle 40.

In the present embodiment, the communication device 23 receives the new vehicle dispatch request data transmitted from the user terminal 60 by communicating with the user terminal 60 that receives the vehicle dispatch request from the new user. According to this configuration, the communication device 23 can receive the new vehicle dispatch request data through communication with the user terminal 60.

In the present embodiment, the communication device 23 transmits the candidate data to the user terminal 60. According to this configuration, the communication device 23 can provide information of the dispatch vehicle candidate to the new user as a response to the new vehicle dispatch request data.

In the present embodiment, the vehicle dispatch service server 20 determines a vehicle dispatch plan for the dispatched vehicle 40 accepted by the new user from among the dispatch vehicle candidates according to the new vehicle dispatch request data and the reserved vehicle dispatch request data. Then, the vehicle dispatch service server 20 transmits the determined dispatch plan to the dispatched vehicle 40 accepted by the new user.

According to the configuration, the dispatched vehicle 40 designated by the new user can acquire the vehicle dispatch plan that is determined in accordance with the new vehicle dispatch request data and the reserved vehicle dispatch request data. Then, due to the dispatched vehicle 40 operating according to the vehicle dispatch plan, even if the dispatched vehicle 40 is dispatched to the new user, the time for the vehicle 40 to operate without a user onboard can be reduced. This can suppress waste of the energy used for the operation of the vehicle 40.

The vehicle dispatch service server 20 can recognize a vehicle dispatch plan for each vehicle 40 by referring to the operation information DB 211. A reserved vehicle 40 can thereby be extracted appropriately.

In the present embodiment, a route for driving around is set for the reserved vehicle 40, the route for driving around being a route for the vehicle to drive around while a user is not using the vehicle until the time when the reserved user is to start using the vehicle. Therefore, by dispatching the reserved vehicle 40 to the new user as described above, it is possible to reduce the time during which the vehicle 40 drives around along the route for driving around while a user is not onboard the vehicle. This can suppress waste of the energy used for the operation of the vehicle 40.

In addition, in the vehicle dispatch service system and vehicle dispatch support method presented in the present embodiment, similar to the vehicle dispatch service server 20, an available vehicle 40 with a short margin time can be set as a dispatch vehicle candidate, and therefore, waste of the energy used for the operation of the vehicle 40 can be suppressed.

In the above embodiment, the vehicle dispatch service system 10 is constituted by the vehicle dispatch service server 20, the vehicle 40, and the user terminal 60. However, the vehicle dispatch service server 20 may be omitted, and the function of the vehicle dispatch service server 20 may be realized by the vehicle 40 or the user terminal 60. If the vehicle 40 realizes the function of the vehicle dispatch service server 20, for example, the vehicle 40 receives the vehicle dispatch request data from the user terminal 60 using the communication device 42. Further, if the user terminal 60 realizes the function of the vehicle dispatch service server 20, for example, the user terminal 60 receives the vehicle dispatch request data using the input device 62.

The present embodiment presents an example in which software implements multiple information processing circuits of the control devices 21, 41, and 61. However, it is also possible to configure the information processing circuits by preparing dedicated hardware for executing the function of each information processing circuit. Further, the multiple information processing circuits may be constituted by individual hardware.

Although an embodiment of the present invention has been described as above, the discussion and drawings forming part of this disclosure should not be construed as limiting the invention. Various alternative embodiments, examples, and operational techniques will be apparent to those skilled in the art from this disclosure.

According to the present invention, a vehicle with a short time to a next reservation can be dispatched for a new request with a short usage time, a vehicle with a long time to a next reservation can be dispatched for a new request with a long usage time, and therefore the operational efficiency of the service can be enhanced.

REFERENCE SIGNS LIST

10 Vehicle dispatch service system
20 Vehicle dispatch service server (vehicle dispatch support device)
21 Control device
22 Storage device
221 Operation information DB
23 Communication device (receiving unit)
40 Vehicle (reserved vehicle, available vehicle, dispatched vehicle, empty vehicle)
41 Control device
42 Communication device
60 User terminal (operating terminal)
61 Control device
62 Input device
63 Display device
64 Communication device

The invention claimed is:

1. A vehicle dispatch support device comprising:
a receiver that receives vehicle dispatch request data including a desired boarding place and a desired alighting place; and
a controller that determines, based on the vehicle dispatch request data, a vehicle dispatch plan for dispatching a vehicle, wherein
the controller:
receives first vehicle dispatch request data requested by a first user,
extracts one or more reserved vehicles for which the vehicle dispatch plan has been determined according to second vehicle dispatch request data that is requested by a second user and is received prior to the first vehicle dispatch request data,
extracts, from the one or more reserved vehicles, one or more available vehicles that can arrive at a desired boarding place of the second user via a desired boarding place and a desired alighting place of the first user prior to a usage start time when the second user is to start using one of the reserved vehicles and that have a remaining amount of energy greater than a required energy that is a sum of an energy required for the reserved vehicle to arrive at the desired boarding place of the second user from a current position of the reserved vehicle via the desired boarding place and the desired alighting place of the first user and an energy required for the reserved vehicle to arrive at the desired alighting place of the second user from the desired boarding place of the second user,
for each of the extracted available vehicles, calculates, as a margin time, a time difference between the usage start time and an arrival time for the available vehicle to arrive at the desired boarding place of the second user via the desired boarding place and the desired alighting place of the first user, and
preferentially sets an available vehicle for which the margin time is relatively short, from among the one or more available vehicles, as a dispatch vehicle candidate to be dispatched to the first user.

2. The vehicle dispatch support device according to claim 1, wherein the controller:
extracts one or more reserved vehicles among the reserved vehicles for which a time from a new request accepted time when the first vehicle dispatch request data is received to the usage start time is equal to or shorter than a determination time that is set in advance.

3. The vehicle dispatch support device according to claim 1,
wherein the controller:
calculates a time from a new request accepted time when the first vehicle dispatch request data is received to the arrival time as a new request time, and
preferentially sets an available vehicle for which the margin time is relatively short and the new request time is relatively short from among the one or more available vehicles as the dispatch vehicle candidate to be dispatched to the first user.

4. The vehicle dispatch support device according to claim 1, wherein the controller:
extracts, as one of the available vehicles, one of the reserved vehicles for which energy necessary for operation in accordance with the second vehicle dispatch request data will remain when the one reserved vehicle arrives at the desired boarding place of the second user via the desired boarding place and the desired alighting place of the first user.

5. The vehicle dispatch support device according to claim 1, wherein the controller:
extracts one of the reserved vehicles that is present in a first range that is set based on the desired boarding place of the first user, as one of the available vehicles.

6. The vehicle dispatch support device according to claim 1, wherein the controller:
extracts, as one of the available vehicles, one of the reserved vehicles for which the desired boarding place of the second user is located in a second range that is set based on the desired alighting place of the first user.

7. The vehicle dispatch support device according to claim 1, wherein
the receiver is a communication device that communicates with an operating terminal which receives a vehicle dispatch request from the first user and receives the first vehicle dispatch request data transmitted from the operating terminal.

8. The vehicle dispatch support device according to claim 7, wherein
the communication device transmits data indicating the dispatch vehicle candidate to the operating terminal.

9. The vehicle dispatch support device according to claim 7, wherein the dispatch vehicle candidate is provided in plurality, and the controller:
determines the vehicle dispatch plan for a dispatched vehicle that is accepted by the first user from among the dispatch vehicle candidates, according to the first vehicle dispatch request data and the second vehicle dispatch request data, and
the communication device:
transmits the determined vehicle dispatch plan to the dispatched vehicle accepted by the first user.

10. The vehicle dispatch support device according to claim 1, wherein the controller:
for each of the reserved vehicles, refers to a database to which the vehicle dispatch plan is associated and extracts one or more of the reserved vehicles.

11. The vehicle dispatch support device according to claim 1, wherein
a route for the reserved vehicles to drive around until the usage start time while a user is not using the reserved vehicles is set for the reserved vehicles.

12. A vehicle dispatch service system comprising:
a vehicle dispatch service server that determines, based on vehicle dispatch request data including a desired boarding place and a desired alighting place, a vehicle dispatch plan for dispatching a vehicle; and
an operating terminal that receives a vehicle dispatch request from a first user and transmits first vehicle dispatch request data to the vehicle dispatch service server, wherein
the vehicle dispatch service server includes:
a communication device that receives the first vehicle dispatch request data transmitted from the operating terminal; and
a controller that processes the first vehicle dispatch request data, and the controller:
receives the first vehicle dispatch request data,
extracts one or more reserved vehicles for which the vehicle dispatch plan has been determined according to second vehicle dispatch request data that is requested by a second user and is received prior to the first vehicle dispatch request data,
extracts, from the one or more reserved vehicles, one or more available vehicles that can arrive at a desired boarding place of the second user via a desired boarding place and a desired alighting place of the first user prior to a usage start time when the second user is to start using one of the reserved vehicles and that have a remaining amount of energy greater than a required energy that is a sum of an energy required for the reserved vehicle to arrive at the desired boarding place of the second user from a current position of the reserved vehicle via the desired boarding place and the desired alighting place of the first user and an energy required for the reserved vehicle to arrive at the desired alighting place of the second user from the desired boarding place of the second user,
for each of the extracted available vehicles, calculates, as a margin time, a time difference between the usage start time and an arrival time for the available vehicle to arrive at the desired boarding place of the second user via the desired boarding place and the desired alighting place of the first user, and
preferentially sets an available vehicle for which the margin time is relatively short, from among the one or more available vehicles, as a dispatch vehicle candidate to be dispatched to the first user.

13. A vehicle dispatch support method for determining, based on vehicle dispatch request data including a desired boarding place and a desired alighting place and a vehicle dispatch plan for dispatching a vehicle, the vehicle dispatch support method comprising:
receiving first vehicle dispatch request data requested by a first user,
extracting one or more reserved vehicles for which the vehicle dispatch plan has been determined according to second vehicle dispatch request data that is requested by a second user and is received prior to the first vehicle dispatch request data,
extracting, from the one or more reserved vehicles, one or more available vehicles that can arrive at a desired boarding place of the second user via a desired boarding place and a desired alighting place of the first user prior to a usage start time when the second user is to start using one of the reserved vehicles and that have a remaining amount of energy greater than a required energy that is a sum of an energy required for the reserved vehicle to arrive at the desired boarding place of the second user from a current position of the reserved vehicle via the desired boarding place and the desired alighting place of the first user and an energy required for the reserved vehicle to arrive at the desired alighting place of the second user from the desired boarding place of the second user,
for each of the extracted available vehicles, calculating, as a margin time, a time difference between the usage start time and an arrival time for the available vehicle to arrive at the desired boarding place of the second user via the desired boarding place and the desired alighting place of the first user, and
preferentially setting an available vehicle for which the margin time is relatively short, from among the one or more available vehicles, as a dispatch vehicle candidate to be dispatched to the first user.

\* \* \* \* \*